(12) United States Patent
Wajs

(10) Patent No.: US 7,245,720 B2
(45) Date of Patent: Jul. 17, 2007

(54) METHOD FOR CONTROLLING THE USE OF A PROGRAM SIGNAL IN A BROADCAST SYSTEM, AND CONTROL DEVICE FOR A RECEIVER FOR CARRYING OUT SUCH A METHOD

(75) Inventor: Andrew Augustine Wajs, Haarlem (NL)

(73) Assignee: Irdeto Access B.V., Hoofddorp (NL)

( * ) Notice: Subject to any disclaimer, the term of this patent is extended or adjusted under 35 U.S.C. 154(b) by 692 days.

(21) Appl. No.: 09/914,127

(22) PCT Filed: Dec. 18, 2000

(86) PCT No.: PCT/EP00/13393

§ 371 (c)(1),
(2), (4) Date: Aug. 21, 2001

(87) PCT Pub. No.: WO01/47270

PCT Pub. Date: Jun. 28, 2001

(65) Prior Publication Data

US 2002/0168963 A1 Nov. 14, 2002

(30) Foreign Application Priority Data

Dec. 22, 1999 (EP) ................................ 99204482

(51) Int. Cl.
H04N 7/167 (2006.01)
H04M 1/66 (2006.01)
H04M 1/68 (2006.01)
H04M 3/16 (2006.01)
G06K 9/36 (2006.01)
G06K 9/46 (2006.01)
G06F 15/16 (2006.01)

(52) U.S. Cl. ...................... 380/210; 380/204; 380/217; 380/239; 455/411; 455/500; 382/232; 709/247

(58) Field of Classification Search ................ 395/200; 380/210–212; 370/314
See application file for complete search history.

(56) References Cited

U.S. PATENT DOCUMENTS 5,469,431 A * 11/1995 Wendorf et al. ............ 370/254
(Continued)

FOREIGN PATENT DOCUMENTS
EP 0 822 720 2/1998
(Continued)

OTHER PUBLICATIONS
PCT—International Search Report—PCT/EP00/13394.
(Continued)

Primary Examiner—Ayaz R. Sheikh
Assistant Examiner—Longbit Chai
(74) Attorney, Agent, or Firm—Schwegman, Lundberg, Woessner, & Kluth, P.A.

(57) ABSTRACT

In a method for controlling the use of a program signal in a broadcast system, comprising one or more broadcasters and a number of receivers, at least a part of the receivers can be provided with a storage medium for storing program signals. The program signal comprises content signals of a first and a second type, wherein the second type of content signals is inserted in time slots in the first type of content signals. At least the first type of content signals is scrambled using control words as scrambling keys to obtain a scrambled program signal. The program signal is scrambled using control words as scrambling keys and the scrambled program signal is broadcasted together with entitlement control messages (ECM's) containing the control words in an encrypted manner using a second key. Decrypting means are provided at each receiver for retrieving the control words from the ECM's by decrypting the ECM's, wherein the control words are delivered by the decrypting means for descrambling the program signal. At least a plurality of ECM's comprises control information to control the decrypting means in such a manner that at least the time slots for second type of content signals are maintained in the first type of content signals.

16 Claims, 3 Drawing Sheets

U.S. PATENT DOCUMENTS 5,577,266 A * 11/1996 Takahisa et al. ............ 455/3.06
5,815,671 A *  9/1998 Morrison ..................... 709/247

FOREIGN PATENT DOCUMENTS

| EP | 0912052 A    | 4/1999 |
| EP | 0912052 A1 * | 4/1999 |
| EP | 0926892 A    | 6/1999 |
| WO | 99 19822     | 4/1999 |

OTHER PUBLICATIONS

"Functional model of a conditional access system", EPO review Technical, Winter 1995, No. 266, Grand-Saconnex, CH, pp. 64-77.

"Standardization of Conditional Access System for Digital Pay Television", D. Van Schooneveld, Phillips Journal of Research, vol. 50, No. 1/2, 1996, pp. 217-225.

* cited by examiner

METHOD FOR CONTROLLING THE USE OF A PROGRAM SIGNAL IN A BROADCAST SYSTEM, AND CONTROL DEVICE FOR A RECEIVER FOR CARRYING OUT SUCH A METHOD

This application is filed under 35 U.S.C. § 371 as a nationalization of PCT application Number PCT/EP00/13393, filed Dec. 18, 2000, which claims priority to European Patent Application EP 99204482.6, filed Dec. 22, 1999.

The invention relates to a method for controlling the use of a program signal in a broadcast system, comprising one or more broadcasters and a number of receivers, at least a part of the receivers preferably having a storage medium for storing program signals, wherein the program signal comprises content signals of a first and a second type, wherein at least the first type of content signals is scrambled using control words as scrambling keys to obtain a scrambled program signal and wherein the scrambled program signal is broadcasted together with entitlement control messages (ECM's) containing the control words in an encrypted manner using a second key, wherein decrypting means are provided at each receiver for retrieving the control words from the ECM's by decrypting the ECM's, and wherein the control words are delivered by the decrypting means for descrambling the program signal. The invention further relates to a control device for a receiver for carrying out such a method, comprising decrypting means for retrieving the control words from ECM's by decrypting the ECM's, and for delivering decrypted control words for descrambling a program signal.

Recently audio/video devices has become available, wherein the device is provided with a storage medium having sufficient storage capacity to store hours of audio/video programs. With such audio/video devices it is possible to use a remote editing agent in the receiver to construct a broadcasting station within the device. The remote editing agent causes video and/or audio clips to be presented to the viewer in a continuous sequence simulating a broadcast service. The sequence can be determined by direct user interaction, user settings or intelligent analysis within the receiver of the user's behaviour.

In many cases, a program signal includes both content signals (or more generally content signals of a first type) and advertisement signals (or more generally content signals of a second type), wherein selling advertisement time slots in the complete program is an important income source of the broadcaster. With the availability of audio/video devices of the above-mentioned type, the remote editing agent can use the user interaction/profile to select which advertisements should be inserted in the advertisement slots in the program signal. In this manner a broadcaster can resell the same advertisement slots to many advertisers and the advertisements can be better targeted to the viewers. This way of tuning advertisement slots to the viewer requires to add data to the program signal with flags indicating the insertion points to insert advertisements in the advertisement slots and data describing the type of advertisements and programs, respectively. However a program signal with flags to indicate the advertisement slots is open to use by unauthorized third parties which can reprogram the receivers to use the program signal provided by the broadcaster to insert their own advertisements or to remove the advertisement slots completely.

The invention aims to provide a method of the above-mentioned type, wherein unauthorized use of a program signal is prevented in an efficient manner.

According to the method of the invention at least a plurality of ECM's comprises control information to control the decrypting means in such a manner that at least the time slots for second type of content signals are maintained in the first type of content signals.

In this manner a method is obtained, wherein unauthorised use of the program signal is prevented, because the decrypted ECM's provided by the broadcaster provide control on the use of the signal, in particular on maintaining the time slots in the first type of content signal.

Preferably, the ECM's comprise first ECM's for the first type of content signals and second ECM's for the second type of content signals, wherein at least a plurality of first and second ECM's is provided with control information, wherein the decrypting means checks the control information and delivers decrypted control words of the first or second ECM's in accordance with the control information to descramble content signals of the first or second type, respectively.

The invention further provides a control device of the above-mentioned type characterized in that the decrypting means is adapted to check the control information of the decrypted ECM's and to insert a time slot in the first type of content signals as indicated by the control information.

The invention will be further explained by reference to the drawings, in which an embodiment of the method and control device of the invention are shown by way of example.

It is noted that in the following examples the insertion of advertisements into a content signal, such as a show or a film, is described. However the invention generally relates to a method for controlling the use of a program signal, wherein the program signal comprises a first type of content signals, i.e. the show or film or the like, and a second type of content signals, for example advertisement signals, wherein the second type of content signals can be inserted into the first type of content signals under the control of the broadcaster.

In the method described the program signal that is broadcasted is scrambled irrespective whether it is a pay service or a service based upon advertisement as source of income. The scrambling is carried out in a usual manner according to a conditional access system with a key hierarchy. It is noted that the structure of the conditional access system and the descrambling/encryption techniques used are not part of the present invention. According to the invention, the conditional access system is used to manage the insertion of the advertisements into the program signal.

Figure 1:
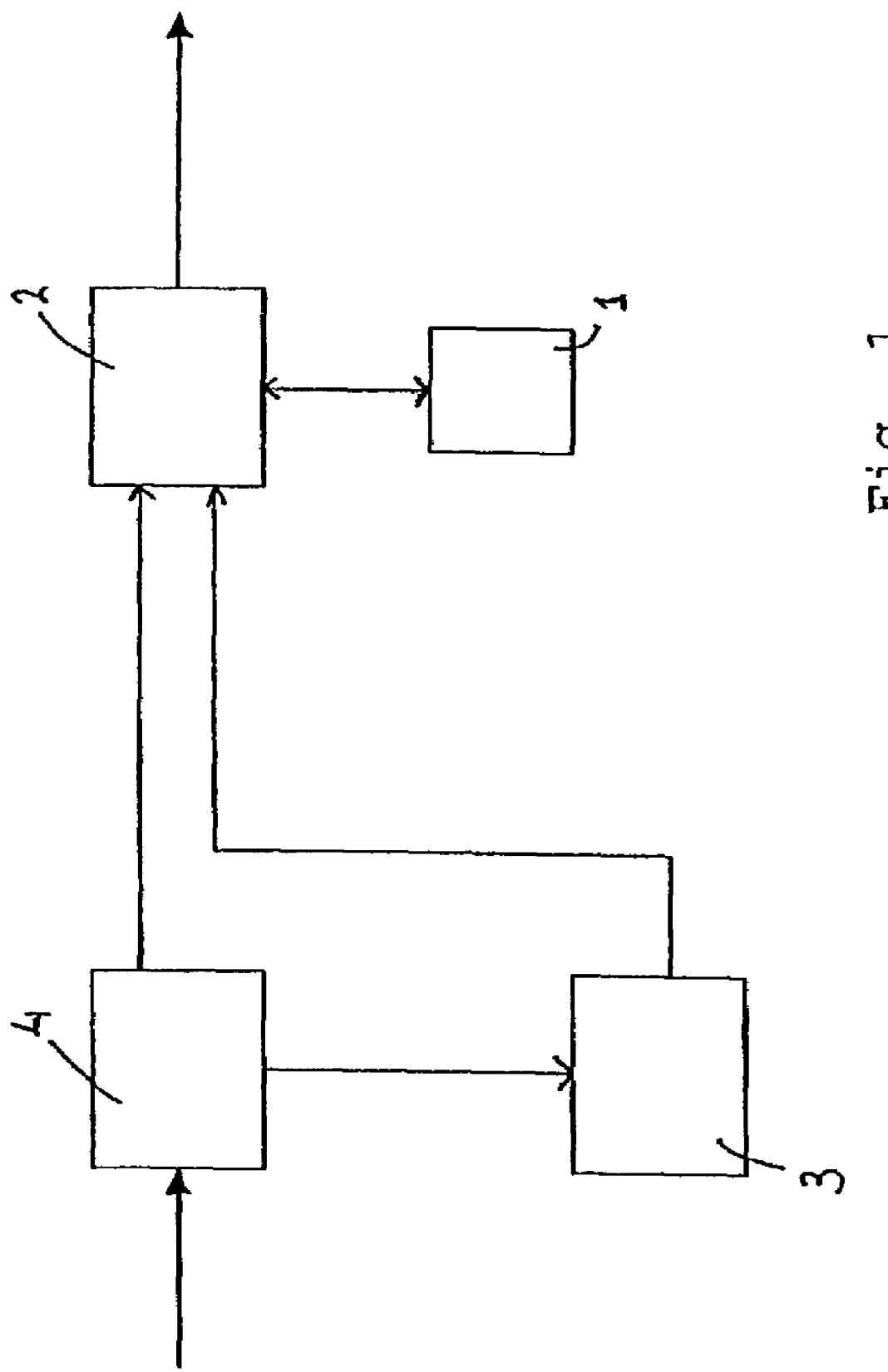
FIG. 1 shows in a very schematic manner an embodiment of a control device of the invention.

The control device shown in FIG. 1 is adapted to operate according to a conditional access system, wherein so-called entitlement control messages or ECM's are broadcasted together with the program signal, wherein the ECM's comprise the control words or first keys which are used to scramble the clear program signal. The control words are encrypted using a second key which is available in the control device, in case of the embodiment shown in FIG. 1 in a smart card 1. The smart card 1 decrypts the ECM's to provide the clear control words to a unit 2 for descrambling the scrambled content signal. The output of the unit 2 provides the clear audio/video signals. The input to the descrambling unit 2 may be a compressed signal, in which case the unit 2 also operates to decompress the signal. The input signals can be retrieved from a storage medium 3, for example a hard disk with large capacity, or directly from a demodulator/demultiplexer 4. The signals stored on the storage medium 3 may come from the demodulator/demultiplexer 4. This part of the control device is not part of the present invention and will therefore not be described further.

Both the content program signal and the advertisement signal have their corresponding ECM's inserted, i.e. content or first ECM's and advert or second ECM's, respectively. Although in this embodiment the advertisement signal is scrambled with advert ECM's, the advertisement signal may be sent in the clear or scrambled using the control word of the last content ECM. This means that it is also possible to use only one type of ECM's.

As the program signal is played back the appropriate ECM's are sent to the smart card and these ECM's are used to control the use of the complete program signal. To this end, the content ECM's may carry control information including a content sequence identifier. This control information can include information on the content and rules for insertion of the advertisement signals into the content. These rules may for example indicate specific advertisements which should be inserted into the specific content signal, for example in case the broadcaster has sold advertisement slots in specific films, shows or the like. It will be clear to the skilled person that the storage medium 3 will have stored several types of advertisement signals, so that different control devices according to FIG. 1 can insert different advertisements depending on user settings or analysis of user behaviour. A further possibility as a rule for insertion of different advertisements is insertion in dependence of the time of the day.

The ECM's of the advertisement signals also may carry control information including a sequence identifier. The control information may include information identifying the advertising material, information specifying how many advert ECM's there are in the sequence of ECM's that delivers control words for one advertisement and the order of ECM's. Typically, a conditional access system changes the control word every few seconds so that with an advertising slot of for example 30 seconds, there may be several ECM's per advertising slot.

The control information may further include timing information specifying a delay between ECM's. In this manner fast forwarding of the advertisements or submission of advert ECM's without actually processing the content can be prevented. The smart card 1 is provided with a real time clock and checks the delay specified by the ECM and if this delay has not passed, the smart card 1 does not accept the next or any other ECM in the sequence before the delay has actually passed. In this manner the advertising slot is enforced during the playback of the program signal.

It is noted that at least a part of the content ECM's may also include timing information in the control information, in particular in ECM's just before and after an advertisement slot to prevent a start of fast forwarding just before the advertisement slot. The sequence identifiers in both types of ECM's are used to signal the smart card 1 a jump to a new point in the program signal.

According to the method of the invention described various rules for insertion of advertisements can be used.

In an embodiment wherein only one type of ECM's are used, the decryption of an ECM can be made dependent on the decryption of a previous ECM. For example by using the sequence identifier of the ECM's a next ECM is only used to obtain the control word if the previous ECM has indeed been used. Skipping a part of the program, in particular the time slot for advertisements is prevented in this manner. As an alternative the same result can be obtained by providing timing indices within one type of ECM's. The timing information in the ECM's will enforce a break in the normal program for insertion of the adverts.

Figure 2:
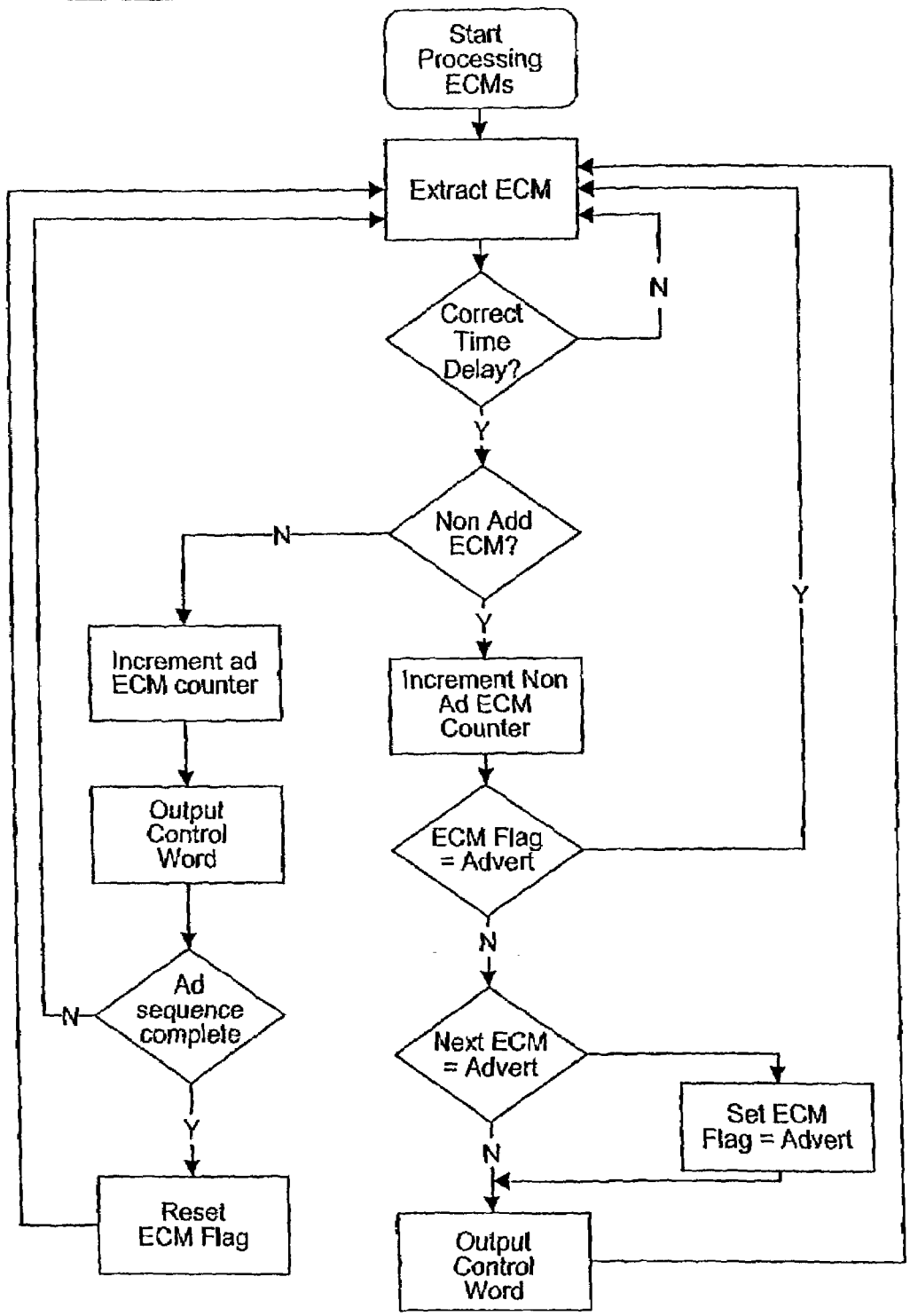
FIG. 2 shows a flow diagram to explain an embodiment of the method of the invention.

FIG. 2 shows an embodiment wherein timing is used to insert the advertisements into the content program signal. By way of example a slot of one minute of advertisement could be inserted into each five minutes of program content. To this end the control information of the content ECM's carry information to count down until the advertisement insertion slot. In the flow diagram shown in FIG. 2, each ECM extracted from the program signal is checked by the smart card on timing information and if the time delay is correct, the ECM is checked on whether or not it is an advert ECM. If it is a content ECM, the content ECM counter is incremented. Depending on the count of the counter, a flag is set to indicate that an advert ECM should be extracted in the next cycles. After outputting the control word to the descrambler 2, a next ECM is extracted. If an advert ECM is detected by the smart card, a counter for advert ECM's is incremented and the output control word is provided to the descrambler 2. When the advertisement slots have passed, the ECM flag is reset to content and a next content ECM is extracted. If the advertisement slot has not yet passed, a next advert ECM is extracted.

As an alternative to the operation shown in the flow diagram of FIG. 2, only the last ECM before the advertisement insertion point could have an indication to instruct the smart card to start an advertisement slot.

During processing advert ECM's, the smart card 1 ensures by checking the time delay that the delay between ECM's is such that the specified advertisement duration is maintained even if the user tries to fast forward during the advertisement slot.

As mentioned above, in this example, the content ECM's could contain control information which indicates that only specific advertisements should be inserted into the next advertisement slot. The smart card will then only allow corresponding advert ECM's to be processed.

It is possible that the user of the control device switches to another channel during the advertisement slot. In order to guarantee that the advertisement is viewed, the smart card 1 can maintain a log of the program that has been watched by retrieving the program signal from the storage medium 3. When the user returns to that channel, the smart card enforces that the correct advertisement sequence is watched before the next part of program content becomes available.

Figure 3:
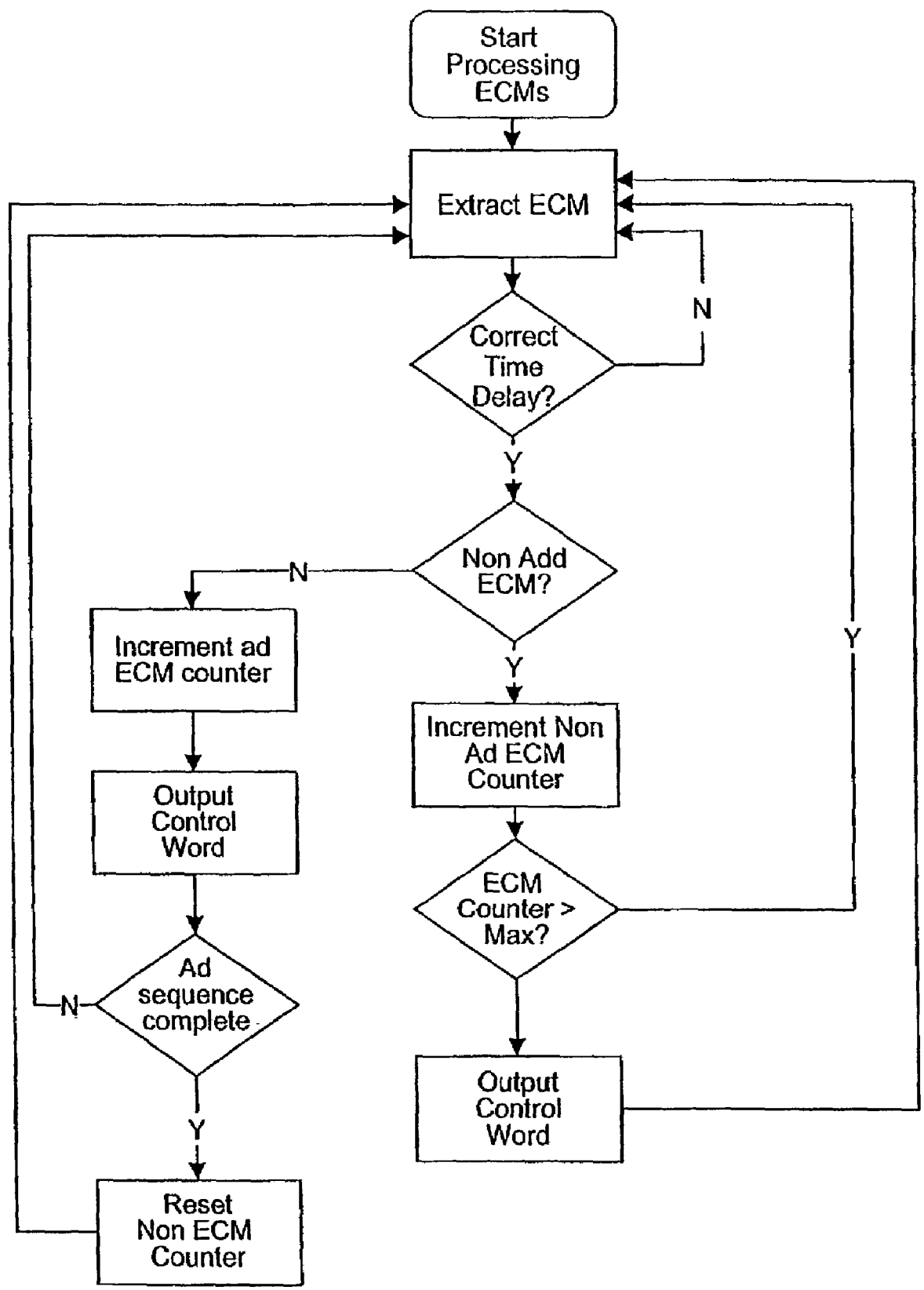
FIG. 3 shows a flow diagram to explain a second embodiment of the method of the invention.

In FIG. 3 a flow diagram of a second embodiment is shown, wherein for both the content ECM's and the advert ECM's a counter is used, wherein the control information of the content ECM's indicates a threshold for the amount of viewing of the program content which must occur before an advertisement can be inserted. Once the threshold, i.e. a minimum amount of viewing time, has been reached the smart card 1 may be programmed such that it waits for an appropriate insertion point or immediately stops processing content ECM's until a predetermined number of advert ECM's are processed.

In this embodiment the control information of the content ECM's may also indicate the appropriate insertion point for the advertisement slot. In this manner the advertisements are not randomly inserted in the middle of a scene but only at a scene boundary for example. Of course, the control information of the content ECM's may also indicate a maximum value of program viewing time and if exceeded, the smart card 1 does not wait until an appropriate insertion point but immediately starts to process advert ECM's.

A program signal may include one or more ECM's having a decision rule as part of the control information, which decision rule provides the user the possibility to select a viewing mode with a particular entitlement to watch the content without advertisement insertion. This particular entitlement may be subscription, pay per view or the like.

As an alternative it can be guaranteed that an advertisement slot is not deleted or skipped by providing control information in the last ECM or plurality of ECM's before the advertisement slot indicating the rate at which ECM's are allowed to be processed or the delay before the next ECM is allowed to be processed. For example, this control information instructs the control device to wait for two minutes before the next ECM can be processed.

Although in the above embodiments the invention is explained when using stored content, the invention can be used in the same manner in watching or listening normal broadcast signals. The advert ECM's can be used to check whether the user has not surfed to another channel. If the user did surf to another channel access to the content of the channel using the described control method, can then be denied for a predetermined period for example.

In the above-described embodiments, a control device is used having a hardware smart card for processing the ECM's as in a conventional conditional access system. According to an embodiment of the invention described, the function of the smart card regarding processing of ECM's can be carried out by a software module which is executed in a microprocessor of the descrambler 2. This software module is provided by the broadcaster and is downloaded over the air into the descrambler 2 and can be changed regularly to prevent unauthorised persons to reprogram the descrambler 2, for example to completely delete the advertisement slots or to insert there own advertisements.

The invention is not restricted to the above described embodiment and can be varied in a number of ways within the scope of the following claims.

The invention claimed is:

1. A system comprising:
a number of receivers, at least some of the receivers having a storage medium to store program signals, wherein the program signals comprise content signals of a first and a second type, wherein the second type of content signals is inserted in time slots in the first type of content signals, wherein at least the first type of content signals is scrambled using control words serving as first keys for scrambling to obtain a scrambled program signal and wherein the scrambled program signal is provided together with entitlement control messages (ECMs) containing the control words in an encrypted manner using a second key,
a decryptor provided at each receiver for retrieving the control words from the ECMs by decrypting the ECMs, and wherein the control words are delivered by the decryptor for descrambling the program signal, and wherein at least a plurality of said ECMs containing the control words in an encrypted manner further comprises control information to control the decryptor in such a manner that the decryptor processes ECMs to deliver decrypted control words for descrambling at least the first type of content signals so as to maintain at least the time slots for second type of content signals in the first type of content signals during playback of the program signal.

2. The system of claim 1, further including a real time clock operated at the receiver side, wherein the control information of an ECM near the beginning of a time slot for the second type of content signals indicates a delay before a next ECM can be decrypted by the decryptor.

3. The system of claim 1, wherein the ECMs comprise a first ECMs for the first type of content signals and a second ECMs for the second type of content signals, wherein at least a plurality of the first and the second ECMs are provided with control information, wherein the decryptor checks the control information and delivers the decrypted control words of the first or the second ECMs in accordance with the control information to descramble content signals of the first or the second type, respectively.

4. The system of claim 3, wherein the control information of said plurality of ECMs comprises timing information, wherein a real time clock is operated at the receiver side, wherein the decryptor checks the timing information of each ECM by means of the real time clock and continues to deliver control words of the ECMs for descrambling the program signal only if the timing information corresponds with the time indication provided by the real time clock.

5. The system of claim 4, wherein a sequence identifier and a minimum delay which should pass before a next ECM should be decrypted are comprised in the control information of said plurality of ECMs as timing information, wherein the decryptor checks the time passed by means of the real time clock and continues to deliver a next control word only if the time passed corresponds with the minimum delay.

6. The system of claim 3, wherein at least a plurality of first ECMs provides control information for the decryptor indicating the decryptor to use a plurality of second ECMs, wherein the control information may comprise timing information on the time period for using first ECMs and on the time period for using second ECMs, and information on the point within the first type of content signals for inserting the second type of content signals.

7. The system of claim 6, wherein the second type of content signals comprise content signals with corresponding ECMs representing various contents, wherein the control information of at least a part of said plurality of first ECMs comprises selection identifiers to allow only a selected content signal with corresponding ECMs to be used for insertion into the first type of content signals as second type of content signals, wherein in particular the selection identifiers select the content signal depending on the time of the day.

8. The system of claim 6, wherein the decryptor forces the receiver to use all second ECMs corresponding to the time period indicated for using the second ECMs independent of the receiver being tuned to the corresponding program signal source.

9. The system of claim 3, wherein an ECM of the first ECMs for the first type of content signals comprises control information to switch the decryptor to deliver only first ECMs for the first type of content signals if the decryptor indicates a viewing mode allowing the use of the first content signals only.

10. The system of claim 1, wherein the control information of the ECMs comprises a sequence identifier including an index number of the previous and/or next ECMs, wherein the decryptor checks the index number of a received ECM against the expected index number, wherein the control word is only provided if the index number received matches the expected index number.

11. The system of claim 1, wherein the control information of an ECM comprises information on the insertion of the second type of content signals in the first type of content signals.

12. The system of claim 1, wherein the ECMs are inserted in the program signal in syncrhronisation with the change of the control words used to scramble the program signal.

13. The system of claim 1, wherein the decrypting means is provided as a software module broadcasted by a broadcaster, wherein the software module is executed in the receivers, wherein the software module is regularly changed by the broadcaster.

14. The system of claim 1, further including a control device for at least one of the number of receivers for controlling the use of a program signal comprising a decryptor to retrieve the control words from ECMs by decrypting the ECMs, and for delivering decrypted control words descrambling a program signal, wherein the decryptor is adapted to check the control information of the decrypted ECMs and to insert a time slot in the first type of content signals by processing ECMs to deliver decrypted control words for descrambling at least the first type of content signals as indicated by the control information.

15. The system of claim 14, wherein the decryptor delivers decrypted control words of the first or second ECMs in accordance with the control words of the first or second ECMs in accordance with the control information to descramble content signals of the first or second type, respectively.

16. The system of claim 14, further comprising a real time clock, wherein the decryptor is adapted to check the timing information in the control information of each ECM by means of the real time clock and to continue to deliver control words of the ECMs to descramble the program signal only if the timing information corresponds with the time indication provided by the real time clock.

* * * * *

UNITED STATES PATENT AND TRADEMARK OFFICE
CERTIFICATE OF CORRECTION

PATENT NO. : 7,245,720 B2 Page 1 of 1
APPLICATION NO. : 09/914127
DATED : July 17, 2007
INVENTOR(S) : Wajs It is certified that error appears in the above-identified patent and that said Letters Patent is hereby corrected as shown below:

In column 7, line 6, in Claim 12, delete "syncrhronisation" and insert -- synchronisation --, therefor.

Signed and Sealed this

Nineteenth Day of August, 2008

JON W. DUDAS
*Director of the United States Patent and Trademark Office*